US006856276B2

(12) United States Patent
Barrick et al.

(10) Patent No.: US 6,856,276 B2
(45) Date of Patent: Feb. 15, 2005

(54) MULTI-STATION HF FMCW RADAR FREQUENCY SHARING WITH GPS TIME MODULATION MULTIPLEXING

(75) Inventors: Donald E. Barrick, Redwood City, CA (US); Peter M. Lilleboe, San Jose, CA (US); Calvin C. Teague, Los Altos, CA (US)

(73) Assignee: Codar Ocean Sensors, Ltd., Los Altos, CA (US)

( * ) Notice: Subject to any disclaimer, the term of this patent is extended or adjusted under 35 U.S.C. 154(b) by 0 days.

(21) Appl. No.: 10/108,769

(22) Filed: Mar. 28, 2002

(65) Prior Publication Data

US 2003/0025629 A1 Feb. 6, 2003

Related U.S. Application Data

(60) Provisional application No. 60/327,217, filed on Oct. 4, 2001, provisional application No. 60/315,567, filed on Aug. 28, 2001, and provisional application No. 60/308,235, filed on Jul. 26, 2001.

(51) Int. Cl.[7] .............................. G01S 7/35; G01S 13/32
(52) U.S. Cl. ........................... 342/59; 342/82; 342/128; 342/175; 342/195
(58) Field of Search .................................. 370/328, 329, 370/215, 276, 299, 295, 319–321, 335–337, 342–344, 347, 442, 443, 444, 201, 485; 342/59, 82, 89, 127, 128, 129, 175, 195, 357.01–357.17; 381/2–18

(56) References Cited

U.S. PATENT DOCUMENTS

| 3,882,506 A | | 5/1975 | Mori et al. |
| 4,172,225 A | | 10/1979 | Woldseth et al. |
| 4,281,409 A | * | 7/1981 | Schneider .................. 370/201 |
| 4,433,336 A | | 2/1984 | Carr |
| 4,613,862 A | * | 9/1986 | O'Donnell .................. 342/59 |

(List continued on next page.)

FOREIGN PATENT DOCUMENTS

| EP | 1017190 A2 | 7/2000 | |
| EP | 1099957 A1 | 5/2001 | |
| GB | 2347319 A | 8/2000 | |
| JP | 8-204600 A | * 8/1996 | ............ H04B/1/26 |
| JP | 10-170628 A | * 6/1998 | ............ G01S/5/14 |
| JP | 11-264864 A | * 9/1999 | ............ G01S/5/14 |
| WO | WO 96/26591 A1 | 8/1996 | |

OTHER PUBLICATIONS

Barrick and Evans, "Impementation of coastal current–mapping HF radar system," *Progress Report No. 1, NOAA Tech Report ERL 373–WPL 47*, 1976.

Barrick and Lipa, "Evolution of bearing determination in HF current mapping radars," *Oceanography*, 10(2):72–75, 1997.

Barrick, "Comment on Single station ocean current vector measurement: Application of the spaced antenna (SA) technique," *Geophys. Res. Letters*, 17:1637–1639, 1990.

(List continued on next page.)

*Primary Examiner*—Bernarr E. Gregory
(74) *Attorney, Agent, or Firm*—Fulbright & Jaworski LLP

(57) ABSTRACT

Systems and methods are described for HF radar frequency sharing with GPS time modulation multiplexing. A method is provided that includes generating clock signals from the time information contained in a GPS signal. Radio frequency signals are transmitted and received in a sequence whose start times are dictated by the clock signals. The clock signals also control the modulation of the radio frequency signals. The radio frequency signals are modulated by using a sweep modulation. An apparatus to implement the method includes a GPS receiver, a state machine, a clock generator, a microprocessor, a memory chip, a signal synthesizer, and a digital data output device. The GPS receiver extracts time information from GPS signals. The state machine controls radar functions versus time. The microprocessor performs modulation multiplexing on radar signals.

31 Claims, 2 Drawing Sheets

U.S. PATENT DOCUMENTS

| | | | | |
|---|---|---|---|---|
| 4,996,533 | A | 2/1991 | May et al. | 342/108 |
| 5,023,618 | A | 6/1991 | Reits | 342/128 |
| 5,252,980 | A | 10/1993 | Gray et al. | 342/59 |
| 5,361,072 | A | 11/1994 | Barrick et al. | 342/133 |
| 5,534,868 | A | 7/1996 | Gjessing et al. | 342/26 |
| 5,990,834 | A | 11/1999 | Barrick et al. | 342/418 |
| 6,137,433 | A | 10/2000 | Zavorotny et al. | 342/26 |
| 6,232,922 | B1 | 5/2001 | McIntosh | 342/453 |
| 6,307,868 | B1 * | 10/2001 | Rakib et al. | 370/485 |
| 6,462,699 | B2 * | 10/2002 | Wurman et al. | 342/59 |

OTHER PUBLICATIONS

Barrick, "FM/CW radar signals and digital processing," *NOAA Tech. Report ERL 283–WPL 26*, 1973.

Barrick, et al., "Ocean surface currents mapped by radar," *Science*, 198:138–144, 1977.

Bjorkstadt and Roughgarden, "Larval transport and coastal upwelling: an application of HF radar in ecological research," *Oceanography*, 10(2):64–67, 1997.

Ereemev, et al., "Reconstruction of oceanic flow characteristics from quasi–Lagrangian data. 2. characteristics of the large–scale circulation in the black sea," *J. Geophys. Res.*, 97(C6):9743–9753, 1992.

Frisch and Leise, "A note on using continuity to extend HF radar surface current measurements," *J. Geophys. Res.*, 86:11089–11090, 1981.

Lipa and Barrick, "Extraction of sea state from HF radar sea echo: Mathematical theory and modeling," *Radio Sci.*, 21:81–100, 1986.

Lipa and Barrick, "Least–squares methods for the extraction of surface currents from CODAR crossed–loop data: Application at ARSLOE," *IEEE J. Oceanic Engr.*, OE–8:226–253, 1983.

Lipphardt et al., "Blending HF radar and model velocities in Monterey Bay through normal mode analysis," *J. Geophys. Res.*, 105(C2):3425–3450, 2000.

Zel'dovich et al., "On the representation of three–dimensional vector fields with scalar potentials (in Russian)," *Dokl. Akad. Nauk. SSSR*, 284(1):103–106, 1985.

* cited by examiner

MULTI-STATION HF FMCW RADAR FREQUENCY SHARING WITH GPS TIME MODULATION MULTIPLEXING

CROSS-REFERENCE(S) TO RELATED APPLICATION(S)

This application is related to, and claims a benefit of priority under 35 U.S.C. 119(e) and/or 35 U.S.C. 120 from, provisional U.S. Ser. No. 60/315,567, filed Aug. 28, 2001, the entire contents of which are hereby expressly incorporated by reference for all purposes.

This application is also related to, and claims a benefit of priority under 35 U.S.C. 119(e) and/or 35 U.S.C. 120 from, provisional U.S. Ser. Nos. 60/308,235 filed Jul. 26, 2001 and 60/327,217 filed Oct. 4, 2001.

BACKGROUND OF THE INVENTION

1. Field of the Invention

The invention relates generally to the field of radars. More particularly, the invention relates to synchronization of multiple radars. Specifically, a preferred implementation of the invention relates to synchronization of multiple radars operating within the same frequency band.

2. Discussion of the Related Art

Lower-frequency radars, operating in the MF, HF, and VHF bands, have a number of uses. The primary application, however, has been the real-time mapping of ocean surface currents and local wave monitoring from coastal stations. For this purpose, these lower frequency radars offer many advantages. (i) With antennas sited at the coast, they have the ability to see beyond the horizon in the surface-wave propagation mode; lower frequencies achieve longer ranges. (ii) Only at these low frequencies can surface currents be extracted from the echo that is Bragg-scattered from the ocean waves; more prevalent microwave radars cannot measure surface currents, and alternative cost-effective measurement technologies do not exist. (iii) Reduced data rates, resulting from the low frequency and unique FMCW signal modulation and processing permit easy, low-cost digital signal generation and processing. The radars considered here may operate typically three orders of magnitude lower in frequency than the more common microwave radars. Over 100 coastal HF radars have been built and now operate for ocean surface current monitoring, and demand for more units is growing rapidly. This number, plus three skywave over-the-horizon radars, constitutes the entire number of all HF radars in the world at present. This contrasts with perhaps 200 million microwave radars built and in existence worldwide.

Because the MF/HF/VHF bands have not been used for most radar applications up to now, there have been no frequency bands designated for radar below 430 MHz, either in the U.S. or worldwide by the ITU (International Telecommunications Union). Thus, users must apply for "secondary licenses", meaning they cannot interfere with "primary" users. To avoid interference, each user would like a frequency separate from all other HF radar users (as well as from the conventional radio users of these bands). The problem is exacerbated by the wide signal bandwidths needed for radar operation in contrast with radio communications. To achieve a 1 km range cell, one needs 150 kHz bandwidth, for example. Typical radio channels occupy 5 kHz bandwidth or less. This means that one radar user monopolizes 30 potential radio channels. Finally, a given fixed bandwidth (like 150 kHz) occupies a much larger fractional bandwidth percentage-wise at HF (e.g., 5 MHz) than at microwave (e.g., 5 GHz). All of this makes it clear that each new user will not receive a separate frequency for his own use; multiple users must share the same frequency in a manner that does not cause mutual interference.

One way to do this is time multiplexing. By this method, several radar stations would time share a frequency, radiating one at a time in a synchronized fashion. Two types of time multiplexing are possible: station sequencing and pulse-to-pulse interleaving.

In the time-multiplexing method referred to as station sequencing, each radar transmits for a several-minute period on a sequential schedule. This has a major disadvantage for mapping surface currents from sea echo. The quality and accuracy of the vector maps improves as longer echo time-series data sets are processed. Present HF coastal radars that have proven to be most effective and acceptable operate continuously, spectrally processing and averaging the data over periods from one to three hours. Sequencing the operation of six radar stations so all can use the same frequency, each for a period of 10 minutes, for example, means that each is on only one-sixth of the time; the drop in data quality would be significant.

Pulse-to-pulse interleaving could be applied to systems where either a short pulse or a sequence of coded pulses is radiated. The echo from a given station's emission is acquired for a given station over an interval corresponding to the time for a signal to travel to and from the most distant range cell from which data is expected. At the end of this time, the waveform emission would normally be repeated. In pulse-to-pulse interleaving, at the end of this period at Radar #1, instead of repeating, Radar #2 transmits its waveform while Radar #1 remains silent (as well as any additional radars operating on that frequency). Next, Radar #3 radiates. Enough guard time is allowed to account for the propagation distance between the different radar sites. This method has an even more severe disadvantage than station sequencing. The time at Radar #1 until its next emission increases proportionately with the number of stations to be interleaved (plus some additional for the guard zones). This decreases the total energy emitted by each radar accordingly. But the signal-to-noise ratio depends directly on the total energy emitted from the radar. Hence, the maximum distance decreases within which high quality echoes can be obtained for a given power level radiated at the radar. This is too costly a penalty to pay.

One unsatisfactory approach, used to address the above mentioned problem, is normal frequency multiplexing. The problem with this method is that the spectral spacing between each frequency must be at least as great as the signal bandwidth. For six radars, this in effect is the same as requesting six separate frequencies, each with a 150 kHz wide channel (to follow the above example).

Another principal obstacle with current technology is the inefficient use of spectral bandwidth resources by multiple radar transmitters and receivers, and inability to allow each radar to operate at maximal efficiency as though none of the other radars were present.

Heretofore, the requirements of an efficient use of radar resources, and the ability to operate multiple radars at a maximum efficiency referred to above have not been fully met. What is needed is a solution that simultaneously addresses these requirements.

SUMMARY OF THE INVENTION

There is a need for the following embodiments. Of course, the invention is not limited to these embodiments.

In one respect, the invention is an apparatus for multi-station radar frequency sharing with GPS time modulation multiplexing. It includes a GPS receiver, a state machine, a clock generator, a microprocessor, a memory chip, a signal synthesizer, and a digital data output device. The GPS receiver extracts time information from GPS signals. The state machine controls radar functions versus time. The microprocessor performs modulation multiplexing on radar signals.

In another respect, the invention is a method for modulation multiplexing multi-source radio signals based on GPS signals. Radio frequency signals are transmitted and received at a rate dictated by the clock signals. The clock signals also control the modulation of the received radio frequency signals. The transmitted and received radio frequency signals are modulated by using a sweep modulation.

In another respect, the invention is a method for modulation multiplexing. A number N of radar stations are assigned a number from 0 to N. Consecutive sweep modulation start times are numbered from 0 to N, each numbered sweep time corresponding to a radar station of the same number. Signals are transmitted and received from the radar station as ordered by the corresponding sweep time.

In another respect, the invention is a method of modulation multiplexing. Radio frequency signals are transmitted and received at times dictated by clock signals. The clock signals also control the start and end times of the modulation of the radio frequency signals. The radio frequency signals are modulated using a sweep modulation.

In yet another respect, the invention is a method of radio frequency sharing with GPS time modulation multiplexing. Radio frequency signals are modulation multiplexed and are offset in time delay or frequency. The radio frequency signals are then demodulated.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation.

BRIEF DESCRIPTION OF THE DRAWINGS

The drawings accompanying and forming part of this specification are included to depict certain aspects of the invention. The invention may be better understood by reference to one or more of these drawings in combination with the description presented herein.

DESCRIPTION OF ILLUSTRATIVE EMBODIMENTS

The invention and the various features and advantageous details thereof are explained more fully with reference to the nonlimiting embodiments that are illustrated in the accompanying drawings and detailed in the following description. Various substitutions, modifications, additions and/or rearrangements within the spirit and/or scope of the underlying inventive concept will become apparent to those skilled in the art from this disclosure.

Techniques of the present disclosure can include providing a simple, inexpensive but precise, universally available timing base (GPS) that will allow synchronization of multiple backscatter radar users.

Techniques of the present disclosure can also include a mix of multiple backscatter and bistatic terminals, all operating simultaneously and sharing the same frequency but avoiding interference among each other.

An unique opportunity is afforded by the waveform and signal processing employed by all of the coastal HF radars that follow the CODAR SeaSonde principle. This patented technique (U.S. Pat. No. 5,361,072) transforms a large RF signal bandwidth (e.g., 150 kHz) into a very small information bandwidth (e.g., 60 Hz) by means of the of the demodulation process in the receiver. This demodulation process permits one to "multiplex the modulation", so that several radars using the same signal formats can overlap in their RF signal bandwidth without their information bandwidths mutually interfering. The beginning of the modulation of each station can be synchronized—using a GPS-derived time reference—so that more than 100 radars all share the same 150 kHz channel (to use the above example), but the performance of one is in no way degraded by the presence of the others on the same frequency at the same time. Thus, each can be gathering data 100% of the time for optimal performance while sharing a valuable, limited spectral resource: a single designated or approved radar channel. This modulation multiplexing overcomes the limitations of the conventional time and frequency multiplexing methods discussed earlier.

Figure 1:
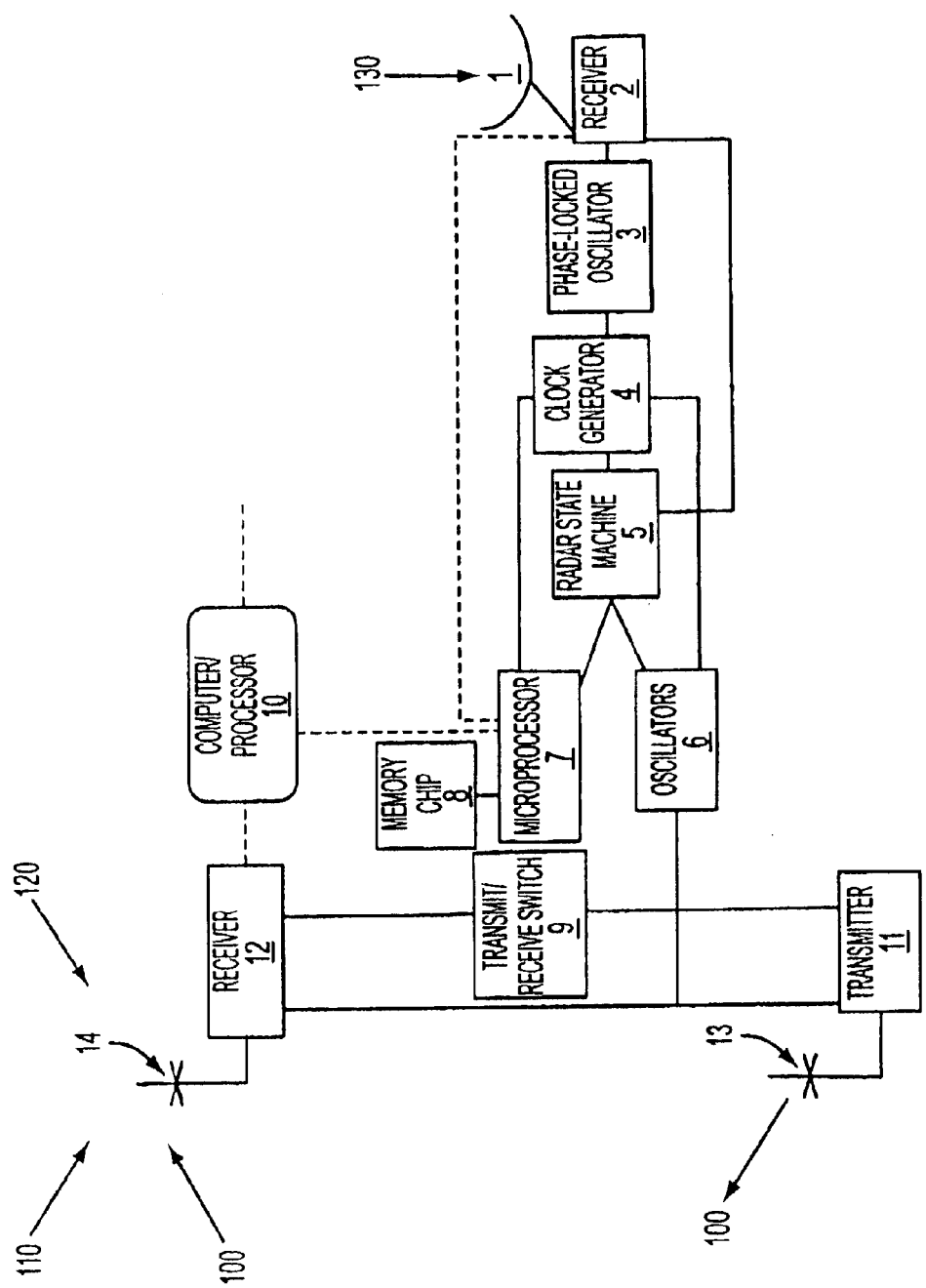
FIG. 1 illustrates a hardware and software embodiment of the invention.
Figure 2A:
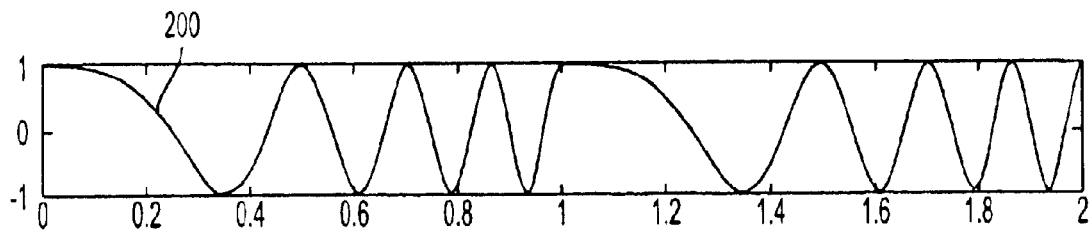
FIG. 2 illustrates waveform signals which enter and exit an embodiment of the invention.
Figure 2B:
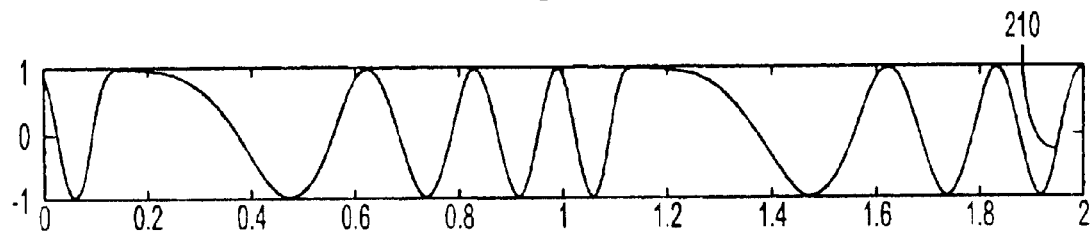
Figure 2C:
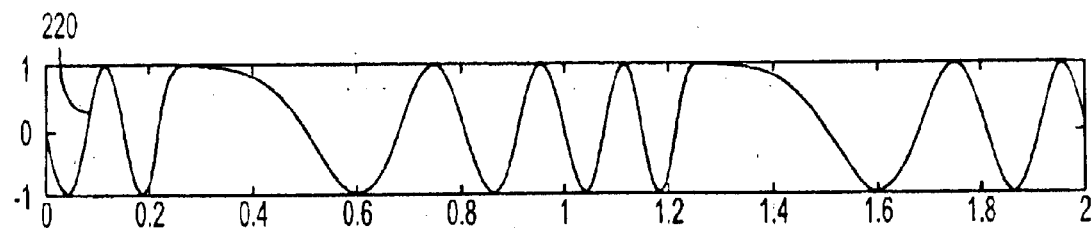
Figure 2D:
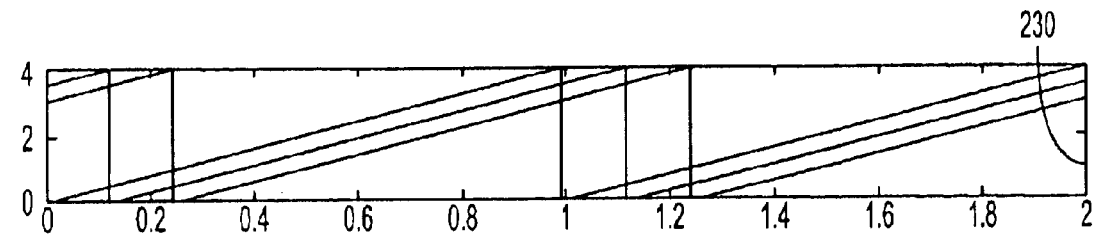
Figure 2E:
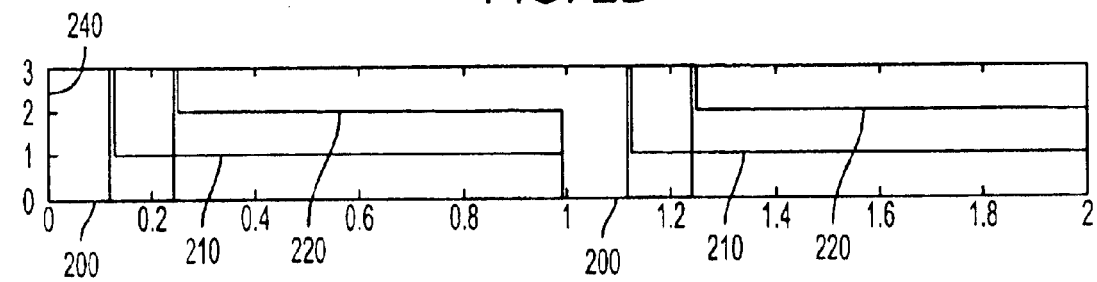

Aspects of the invention will be explained in detail with reference to FIG. 1 and a drawing of the signal waveforms shown in FIG. 2. The block diagram in FIG. 1 shows both hardware components and software steps useful in describing the present invention. To the far left are the HF radar antenna elements: transmit and receive. To the far right is the GPS antenna. Blocks shown as sharp-cornered rectangles are hardware components. Rounded-corner rectangles all represent software steps done on the received radar data that are executed on a computer, which in one embodiment is running in real time. Lines connecting the blocks of the diagram are shown solid if the signals are analog; they are dashed if the signals are digital. The conceptual steps of the hardware and software that embody this invention will be clarified by referring to the signal sketches of the second figure. The output of the radar receiver desktop computer, 10, is the digital surface current or wave information, shown as the dashed line exiting to the right of block 10.

The Global Positioning System (GPS) Time Source

Starting to the far right of the block diagram in FIG. 1, signals 130 from a visible constellation of GPS satellites impinge on the GPS antenna 1, and pass into the GPS receiver 2. The receiver 2 is designed specifically to extract time information from the GPS signals, in contrast with the far more common positional information of conventional GPS receivers, which was the main intention and purpose of the GPS satellite network. In order to provide accurate positional information, the individual satellites, however, carry timing signals that are synchronized among each other to a precision and accuracy of a few nanoseconds. In one embodiment, these timing signals may be sent to earth at one second intervals.

Depending on the GPS signal-to-noise ratio (SNR), the pulse-per-second positions of these signals in time are extracted and outputted by its receiver 2. Because the instantaneous timing position is not known to nanosecond accuracy with typical SNR levels available by small earth-based stations, the final stage of the GPS receiver is a heavy low-pass filter, called a phase-locked oscillator (PLO), which increases the time positional accuracy by orders of magnitude. This PLO essentially serves as an electronic flywheel with high inertia, and may require an hour or more to build up the desired $10^{12}$ to $10^{13}$ parts per million timing accuracy desired for this application.

The Advanced Waveform Generator (AWG) Module

Concepts that represent one embodiment of the present invention begin with the commercially available AWG module, specifically designed and built by CODAR Ocean Sensors, Ltd. (Los Altos, Calif.) for this application. The outputs of block 2 are: (i) a very stable 10 MHz clock signal that passes into another phased-locked oscillator 3; and (ii) a very stable one-pulse-per-second data stream that is fed to the radar state machine 5. The 10 MHz signal fed to the phase-locked oscillator 3, is converted to a 120 MHz timing signal that is used for generation of the radar carrier and other internal frequencies required. This 120 MHz reference signal is passed to the clock generator 4. It divides down to generate a number of other reference frequencies needed by other devices: (i) a 12 MHz signal fed to the microprocessor 7; (ii) a 40 MHz reference fed to the radar state machine 5; and (iii) a 60 or 120 MHz signal that is passed to the direct signal synthesizer (DSS) and its oscillators 6.

The primary function of the radar state machine 5 is to tell the radar what to do versus time. For example, it generates signals that turn on and off the transmitter output and receiver input signals, so that they are not on at the same time. It also turns on and off switches or gates that further suppress, transmit, or receive signals at various points in the system when they are not wanted. And, importantly, it determines the start and end of the linear frequency sweep modulation that is important to the present invention. Different sweep start times in different radars that are synchronized via the common GPS timing separate the local sea-echo information from each so that they do not interfere with each other.

The microprocessor 7, supported by memory chip 8, is the interface to the digital parts of the system, such as the desktop computer 10, that allows the human operator to control the radar and processes the received echo signals in real time. Its communications outputs to the computer are several in form: USB; serial outputs (e.g., RS-232); and system bus signals. It also communicates via RS-232 serial cable to the GPS receiver 2. Finally, it sends signals to the transmit/receive (T/R) switch 9. The latter turns on and off various channels in the radar transmitter 11, and receiver 12 that suppress their signals at the appropriate times during the pulsing cycle.

The actual radio-frequency (RF) signals needed by the transmitter 11, and receiver 12, are generated in the direct signal synthesizer (DSS) block 6. These signals contain the sweep and pulse modulations. The sweep span in frequency, sweep repetition interval, pulse and blank periods, and the carrier frequency are all digitally represented and generated, ensuring that each periodic repetition of the waveform is identical to all previous cycles. This guarantees that spurs and other waveform imperfections will be shifted to DC (the zero-Doppler spectral position), so as not to contaminate the Doppler-shifted sea echo information. Carrier frequencies between 0 and 75 MHz can be generated by the CODAR AWG module via this DDS chip. Its output signals are passed to the transmit amplifier 11, and radiated through the transmit antenna 13. Replicas of these signals, along with their quadrature versions, are mixed in the receiver 12, with the incoming echo, noise, and other radar signals that enter its antenna system 14.

All of these functions performed within the AWG block are implemented as a sealed module that is 6"×5"×1" in size, as implemented in the CODAR SeaSondes.

Modulation Multiplexing to Allow Multiple Station Operation

An important aspect of the present invention is the synchronized timing of the linear frequency modulation sweep start times of multiple radar transmitters operating on the same carrier frequency. Queued from the same GPS common timing signal, they are programmed to start at precisely designated, slightly different times. These times will depend on the radar site geometries with respect to each other, whose optimal determination is described in the next section. An embodiment of the invention is shown in FIG. 1. Three signals 100, 110, 120 from three different radar transmitters employing this concept are illustrated in FIG. 2. The signal 100 radiated from the radar serving as a reference (Radar #1) is shown leaving the transmit antenna, 13. Signal 100 immediately enters the receive antenna 14. Very closely behind it in time are sea echoes from that radar's own transmission. However, the strong direct signals from Radar #2 and Radar #3 also simultaneously enter the radar antenna 14, and receiver 12 also. For now, one can assume that all signals are continuous wave (CW) for the sake of clarity, i.e., not pulsed, although the invention works with and covers the standard pulsed-gated linear FM modulation of U.S. Pat. No. 5,361,072.

The upper three panels of FIG. 2 show exaggerated plots of the direct signal waveforms from the reference Radar #1 200, as well as Radar #2 210 and Radar #3 220, consecutively from the top. The direct signal sources from Radars #2 210 and #3 220 are most important, rather than their respective sea echoes. Their sea echoes are low and are sufficiently spread spectrally so that they would not likely be visible as radar interference. The figure shows that the potentially interfering direct signal waveforms from Radars #2 210 and #3 220 are each slightly delayed in time. In practice for CODAR SeaSonde operation, the sweep repetition period is 0.5 second, and the sweep delays are of the order of 1 millisecond; the offsets shown in the second and third panels are exaggerated here to illustrate the concept. The center carrier frequency may typically lie near 13 MHz, and the frequency may sweep over 50 kHz; this would provide a 3 km range resolution. Units shown on the sketch axes are arbitrary.

In the receiver, the direct transmit signal that is presently being radiated 200 is mixed with the received signals. Both the mixer input (transmit signal) and the receiver signals have the same swept linear frequency modulated waveforms, just delayed in time from each other. The fourth panel from the top 230 shows the instantaneous frequencies as a function of time for the previous three direct signal waveform panels.

The mixing process removes the sweeps by subtracting the two signal phases. When the demodulated outputs of this mixing process are plotted as frequency of the signals with respect to time, the bottom panel 240 shows the results for the reference radar 200, as well as those for the two interfering signals 210, 220. The direct signal after demodulation falls at zero frequency, and the sea-echo Doppler information for all of the usable range span of the reference radar typically lies within 100 Hz of DC (i.e., zero frequency).

In FIG. 1, the low-pass filtering in the receiver 12, as well as the digital spectral processing in the computer/processor 10, separates one radar's echo information while discarding all of the interfering direct signals from the other radars. Thus, Radars #2 and #3 will have programmed offsets of their sweep modulation starts such that their receiver demodulated outputs are separated by at least 100 Hz, in a region that does not overlap the information from the desired reference radar. Hence, even though several radars all share the same 50 kHz frequency channel simultaneously and their signals enter each others' receivers, their demodulated information bands are distinctly separated by the GPS-synchronized modulation multiplexing concepts behind the present invention. In theory, if the sweep or RF bandwidth of the radar signal is 50 kHz and the information bandwidth after demodulation is only 50 Hz, as many as 50,000/50= 1000 stations can all operate in the same frequency channel without mutual interference or degradation of their information.

In practice, when pulsing is superposed on the sweep modulation, this number may drop to 20. However, if more radars are grouped geographically in bunches of 20, to be GPS-synchronized only within each group, radars in more distant geographical groupings can operate with impunity because their inter-group distances keep their signals sufficiently weak as to be non-interfering. Thus, hundreds of radars spread across a country or continent can be made to operate without mutual interference on the same frequency channel.

Methodology to Offset Modulations in Order to Minimize Total Spectral Occupancy by Several Radars An important part of the invention is to find a scheme that determines the optimal start times for the sweep modulations of multiple stations, so as to maximize the total number of radiating stations using the same frequency channel. Described here is one embodiment of such an optimization scheme. Then for clarity, an example is given for three stations along a straight coastline.

The algorithm described here employs constrained minimization, where the function to be minimized is the transmission sweep time start of the last station, the Nth station, where the first station starts at "zero time" and all of the other stations have start times between zero and that of the Nth. Representing the station number under consideration as n, then n varies between 1 and N, and the consecutive sweep start times are ordered from zero time (for the n=1st station) in increasing order of n. Constraints are that for each station n, the time of reception of the direct signal from station n+1 is greater than the time of reception of the most distant expected ocean echo from station n's radiated signal. The number n assigned to a given station may be done arbitrarily; there are N-factorial permutations possible for this assignment. Stepping through all of these possible permutations, one will find the best permutation as the one that corresponds to the lowest total time between sweep start for the 1st and the Nth stations. The results turn out to be symmetric in the transmission order; i.e., if $\{1, 3, 4, 2\}$ order is optimal, then $\{2, 4, 3, 1\}$ gives the same optimal result also.

The "Linear Programming" tool of the commercially available Mathematica software package available for PCs, Macintoshes, or Workstations was used. Setting up the "constraint matrix" involves entering the inter-station distances and the maximum echo distance expected from each.

By using this methodology to pack the sweep start times of N stations into the smallest possible time span, one is also packing their information bandwidth after demodulation into the smallest possible bandwidth. This relation between sweep start time and the demodulated frequency at which the signal appears was covered in the preceding section. Stated in another way, the methodology of this section allows the maximum possible number of stations at fixed locations to be packed into a given information bandwidth space (for example, 2 kHz), without mutually interfering with each other. This constraint is applicable for both backscatter and bistatic radar configurations.

For example, assume there are three stations located along a straight North/South coastline, spaced roughly 30 km apart. Assume that these systems are backscatter radars (not bistatic). Also, assume that the maximum range for each radar (meaning the outer bound for the region from which echoes are collected) is 100 km. Finally, it is assumed that there is no guard zone between one radar's echoes and the next radar's direct signal reception time.

The following are the exact station locations (latitude and longitude) that were entered into the constrained minimization program:

Station 1: 122° 0' W; 36° 43.782' N;
Station 2: 122° 0' W; 37° 00.000' N;
Station 3: 122° 0' W; 37° 16.218' N.

The best solution in terms of packing space for start times is found when the station sequencing is arranged $\{1, 3, 2\}$ or $\{2, 3, 1\}$. The consecutive start times in microseconds for their sweeps are then: $\{0; 466.67;$ and $1033.34\}$. Following the example used earlier of 50 kHz sweep width that gives 3 km range cells, and 2 Hz sweep repetition rate (corresponding to sweep repetition interval of 0.5 second), this means that the three stations are packed into a demodulated information bandwidth of 103.34 Hz. The echoes from each radar produce an information content bandwidth that does not overlap that from either of the other two.

Present CODAR SeaSonde demodulated output processing saves an information bandwidth between $-2048$ Hz and $+2048$ Hz, and so the contents of all three radars fall within the digitized signal information capacity of the radars, but do not overlap each other within this band.

Finally, one should note that one or more of these three could be bistatic transmitters, with the remaining receiver(s) recording not only its own backscatter echoes, but also the echoes from the bistatic transmitter(s) with which it synchronously, coherently operates. This allows one receiver to simultaneously serve more than one transmitter, giving a simple backscatter radar network a greatly expanded capability by adding bistatic enhancement of coverage, resolution, and accuracy.

The terms a or an, as used herein, are defined as one or more than one. The term plurality, as used herein, is defined as two or more than two. The term another, as used herein, is defined as at least a second or more.

PRACTICAL APPLICATIONS OF THE INVENTION

A practical application of the invention that has value within the technological arts is for the real-time mapping of ocean surface currents. Further, the invention is also useful for local wave monitoring from coastal radar stations. Other uses will be apparent to those of ordinary skill in the art, with the benefit of this disclosure.

ADVANTAGES OF THE INVENTION

Accordingly, advantages of the present invention center on the ability for multiple HF radars that could normally mutually interfere with each other, to operate on the same frequency with no loss in performance.

All the disclosed embodiments of the invention disclosed herein can be made and used without undue experimentation in light of the disclosure. The invention is not limited by theoretical statements recited herein.

REFERENCES

Each of the following references are hereby incorporated by reference in their entirety.

| U.S. patents: | | |
|---|---|---|
| 3,882,506 | 1975 | Mori et al. |
| 4,172,255 | 1979 | Barrick and Evans |
| 4,433,336 | 1984 | Carr |
| 5,023,618 | 1991 | Reits |
| 5,361,072 | 1994 | Barrick et al. |
| 5,990,834 | 1999 | Barrick and Lipa |

1. Barrick, D. E. (1973), FM/CW radar signals and digital processing, NOAA Tech. Report ERL 283-WPL 26.
2. Barrick, D. E. and M. W. Evans (1976), Implementation of coastal current-mapping HF radar system, Progress Report No. 1, NOAA Tech. Report ERL 373-WPL 47.
3. Lipa, B. J. & D. E. Barrick (1983), Least-squares methods for the extraction of surface currents from CODAR crossed-loop data: Application at ARSLOE, IEEE J. Oceanic Engr., vol. OE-8, pp. 226–253.
4. Lipa, B. J., & D. E. Barrick (1986), Extraction of sea state from HF radar sea echo: Mathematical theory and modeling, Radio Sci., vol 21, pp. 81–100.
5. Barrick, D. E. and B. J. Lipa (1997), Evolution of bearing determination in HF current mapping radars, Oceanography, vol. 10, no. 2, pp. 72–75.

What is claimed is:

1. A method of radio frequency sharing, comprising:
    receiving GPS signals;
    extracting time information from the GPS signals;
    generating clock signals from the time information;
    controlling a start and an end of a modulation of radio frequency signals of the same bandwidth at time intervals using the clock signals, the time intervals being dictated by a site geometry of locations of radar transmitters that transmit the radio signals; and
    demodulating the radio frequency signals.

2. The method of claim 1, the modulation comprising a sweep modulation.

3. The method of claim 2, the radio frequency signals comprising FMCW radar signals that are on 100% of the time.

4. The method of claim 2, the radio frequency signals comprising pulsed or gated FMCW signals of any duty factor.

5. The method of claim 2, further comprising transmitting the radio frequency signals.

6. The method of claim 1, wherein demodulating the radio frequency signals comprises receiving the radio frequency signals.

7. The method of claim 1, comprising the use of bistatic transmitters operating simultaneously with backscatter radars.

8. The method of claim 1, comprising the use of bistatic transmitters operating simultaneously with backscatter radars with several transmitters sharing the same receivers.

9. A method, comprising:
    controlling a start and an end of a modulation of radio frequency signals at time intervals using clock signals that are based on time information from GPS signals, the time intervals being dictated by a site geometry of locations of radar transmitters that transmit the radio signals; and
    modulating the radio frequency signals by using a sweep modulation.

10. The method of claim 9, further comprising transmitting the radio frequency signals.

11. The method of claim 9, wherein the radio frequency signals are of the same bandwidth.

12. The method of claim 9, the radio frequency signals comprising FMCW radar signals that are on 100% of the time.

13. The method of claim 9, the radio frequency signals comprising pulsed or gated FMCW signals of any duty factor.

14. The method of claim 9, comprising the use of bistatic transmitters operating simultaneously with backscatter radars.

15. A method, comprising:
    representing a plurality of radar stations as a plurality of integers from 0 to N;
    ordering a plurality of consecutive sweep modulation start times with the plurality of integers from 0 to N, each one of the plurality of consecutive sweep modulation start times corresponding to one of the plurality of radar stations corresponding to one of the plurality of integers;
    transmitting a plurality of signals from the plurality of radar stations as dictated by the plurality of consecutive sweep modulations start times; and
    receiving a plurality of signals at the plurality of radar stations as dictated by a plurality of consecutive sweep modulations end times.

16. The method of claim 15, wherein the plurality of signals are all of the same bandwidth.

17. The method of claim 15, wherein ordering the plurality of consecutive sweep modulation start times includes testing all possible N permutations to find a sweep modulation order that corresponds to a lowest total time between a sweep start time for a first radar station and a sweep start time for a Nth radar station as to pack a maximum number of stations into a minimum information bandwidth space.

18. The method of claim 15, wherein the plurality of consecutive sweep modulation start times are dictated by GPS signals.

19. The method of claim 18, wherein the plurality of consecutive sweep modulation start times are also dictated by relative site geometries of the radar stations.

20. A method of using GPS time to synchronize a plurality of radars, enabling the plurality of radars to operate within the same frequency band, comprising:
    receiving a GPS signal;
    extracting time information from the GPS signal;
    generating a plurality of clock signals from the time information;
    controlling a start and an end of a modulation of a plurality of radio frequency signals at time intervals dictated by the plurality of clock signals; and
    modulating the plurality of radio frequency signals by using a sweep modulation.

21. The method of claim 20, wherein the plurality of radio frequency signals are FMCW radar signals that are on 100% of the time.

22. The method of claim 20, wherein the plurality of radio frequency signals are pulsed or gated FMCW signals of any duty factor.

23. The method of claim 20, wherein using GPS time to synchronize a plurality of radars is used for bistatic transmitters operating simultaneously with backscatter radars.

24. The method of claim 20, wherein the plurality of radio frequency signals are all of the same bandwidth.

25. The method of claim 20, further comprising transmitting the plurality of radio frequency signals.

26. The method of claim 25, further comprising receiving the plurality of radio frequency signals.

27. An apparatus for multi-station radar frequency sharing, comprising:
- a state machine, which controls radar functions versus time to determine a start and end of a radio frequency modulation using clock signals that are based on GPS time information;
- a clock generator;
- a microprocessor to analyze a plurality of radar signals;
- a memory chip;
- a signal synthesizer; and
- a digital data output device.

28. The apparatus of claim 27, further comprising
- a radar transmitter;
- a radar receiver; and
- a transmit/receive switch.

29. An apparatus for multi-stations radar frequency sharing, comprising:
- a GPS receiver which extracts time information from GPS signals;
- a phase-locked oscillator;
- a state machine, which controls radar functions versus time to determine a start and end of a radio frequency modulation using clock signals that are based on the time information from the GPS signals;
- a clock generator, which uses, as its reference time, the time information from the GPS signals;
- a microprocessor programmed to modulation multiplex radar signals;
- a memory chip;
- a signal synthesizer; and
- a digital data output device.

30. The apparatus of claim 29, wherein the GPS receiver includes a phase-locked oscillator.

31. The apparatus of claim 29, further comprising
- a radar transmitter;
- a radar receiver; and
- a transmit/receive switch.

* * * * *